United States Patent
Sarma et al.

(10) Patent No.: US 7,132,838 B2
(45) Date of Patent: Nov. 7, 2006

(54) ACTIVE SENSOR CIRCUIT WITH ONE OR MORE T-NETWORK PAIRS

(75) Inventors: Garimella R. Sarma, Newport News, VA (US); Siva M. Mangalam, Williamsburg, VA (US)

(73) Assignee: Tao of Systems Integration, Inc., Hampton, VA (US)

( * ) Notice: Subject to any disclaimer, the term of this patent is extended or adjusted under 35 U.S.C. 154(b) by 2 days.

(21) Appl. No.: 11/054,642

(22) Filed: Feb. 9, 2005
(Under 37 CFR 1.47)

(65) Prior Publication Data

US 2005/0253600 A1    Nov. 17, 2005

Related U.S. Application Data

(60) Provisional application No. 60/552,087, filed on Mar. 11, 2004.

(51) Int. Cl.
  *G01R 27/08* (2006.01)
  *G01L 1/00* (2006.01)
(52) U.S. Cl. .................. 324/721; 324/691; 73/766; 702/42
(58) Field of Classification Search ............. 324/721, 324/691; 702/42; 73/766
  See application file for complete search history.

(56) References Cited

U.S. PATENT DOCUMENTS

| 4,202,218 A | 5/1980 | Romo |
| 4,337,665 A * | 7/1982 | Sato et al. ................. 73/766 |
| 4,363,243 A | 12/1982 | Poff |
| 5,074,147 A | 12/1991 | Sarma |
| 5,361,637 A * | 11/1994 | Judd et al. ................. 73/766 |
| 5,854,425 A * | 12/1998 | Sarma ..................... 73/204.18 |
| 6,134,959 A | 10/2000 | Mangalam et al. |
| 6,147,312 A | 11/2000 | Lockery |
| 6,417,678 B1 * | 7/2002 | Furukawa ................. 324/721 |
| 6,826,493 B1 | 11/2004 | Mangalam |

* cited by examiner

*Primary Examiner*—Vincent Q. Nguyen
*Assistant Examiner*—Amy He
(74) *Attorney, Agent, or Firm*—Hunton & Williams LLP (57) ABSTRACT

A sensor circuit is provided that includes a first T-network including a first impedance serially connected to a second impedance at a first junction and a first variable resistance sensor element connected at a first end to the first junction and at a second end to ground. The sensor circuit also includes a second T-network including a third impedance serially connected to a fourth impedance at a third junction and a second variable resistance sensor element having first and second sensor element ends. The first sensor element end is connected to the third junction and the fourth impedance is connected to the second junction. The sensor circuit further includes a constant voltage source connected to the third impedance and to ground. The second end of the second variable resistance sensor element is connected to a fourth junction intermediate the constant voltage source and ground.

23 Claims, 5 Drawing Sheets

ACTIVE SENSOR CIRCUIT WITH ONE OR MORE T-NETWORK PAIRS

This application claims the benefit of U.S. Provisional Application No. 60/552,087, filed Mar. 11, 2004, which is incorporated herein by reference in its entirety.

BACKGROUND OF THE INVENTION

The invention relates generally to circuitry for use in conjunction with sensor devices and, more particularly, to a high sensitivity sensor circuit that minimizes the effects of environmental changes on sensor data.

A variety of instruments and electronic measuring devices rely on the measurement of resistance or changes in resistance of conductive elements disposed in a particular environment. Such instruments may include resistance strain gages used to measure static and dynamic strains on a structure and resistance-based temperature sensors. Resistance-based instruments typically comprise a detector element in the form of a filament or film that may be positioned in a measurement configuration/environment so as to respond to changes in an imposed environment or to changes in a secondary responses changes in an imposed environment. The detector element forms a part of a sensor circuit that may be used to identify changes in the resistance of the element. In strain gages, these changes in resistance relate primarily to changes in elongation or compression of the sensor element. They can, however, also relate to temperature changes in the detector element or to other structural changes.

In prior art sensor systems, detector elements are often placed in one or more (to a maximum of four) arms of a Wheatstone bridge circuit and supplied with a source of electrical energy. A difference of potential, the value of which is mathematically related to the strain in the device appears across the measuring diagonal of the Wheatstone bridge. A variation on this approach is to place up to two detector elements into a potentiometer network. Conventional Wheatstone bridge circuits have been used extensively for resistance sensor applications for many years and have many useful features. One such useful feature is a temperature compensation capability. The major drawback of bridge networks, however, is that the bridge output's sensitivity to resistance changes is inherently limited, thus necessitating large subsequent amplification. It is a well known fact that such amplification causes deterioration of the signal-to-noise ratio of the measured data. Another drawback is that bridge output is proportional, not only to changes in the target measurement variables (e.g., strain or temperature), it is also a function of the absolute value of these measurement variables. This dependence on absolute values may result in nonlinearity unless corrected by a separate measurement. Finally, the Wheatstone bridge has the inherent limitation that only four sensors can be used efficiently for data measurement.

SUMMARY OF THE INVENTION

The present invention addresses the deficiencies in the prior art by making the sensor elements part of an active circuit, thereby enhancing front end sensitivity and reducing or eliminating the need for subsequent amplification. An illustrative aspect of the invention provides a sensor circuit comprising a first T-network including a first impedance serially connected to a second impedance at a first junction and a first variable resistance sensor element connected at a first end to the first junction and at a second end to ground. The sensor circuit further comprises an operational amplifier having a non-inverting amplifier input terminal connected to ground, an inverting amplifier input terminal connected to the first impedance at a second junction and an amplifier output terminal connected to the second impedance. The sensor circuit also comprises a second T-network including a third impedance serially connected to a fourth impedance at a third junction and a second variable resistance sensor element having first and second sensor element ends. The first sensor element end is connected to the third junction and the fourth impedance is connected to the second junction. The sensor circuit further comprises a constant voltage source connected to the third impedance and to ground. The second end of the second variable resistance sensor element is connected to a fourth junction intermediate the constant voltage source and ground.

Another aspect of the invention provides a method of obtaining sensor data using a sensor circuit with a plurality of T-networks. The circuit includes a first T-network adapted for incorporating a first variable resistance sensor element, an operational amplifier combining with the first T-network to form a sensor feedback loop and a second T-network connected to the first T-network and the operational amplifier. The second T-network is adapted for incorporating a second variable resistance sensor element. The sensor circuit also includes a constant voltage source connected to the second T-network and is adapted to provide an output voltage proportional to changes in the resistance of the first sensor element when the first sensor element is subjected to a data measurement condition of interest. The method comprises mounting the first variable resistance sensor element to a structure in a data measurement configuration in which the first variable resistance sensor element will experience the data measurement condition of interest and a temperature environment. The method further comprises incorporating the first variable resistance sensor element into the first T-network. The second variable resistance sensor element is mounted in a temperature compensation configuration in which the second variable resistance sensor will experience the temperature environment. The second variable resistance sensor element is incorporated into the second T-network. The method further comprises establishing the data measurement condition and the temperature environment and monitoring the output voltage of the sensor circuit.

DETAILED DESCRIPTION OF THE INVENTION

The present invention incorporates sensor element pairs into an active circuit configured to provide compensation for environmental effects by using appropriate compensation gage format and algebraic addition of sensor output. Using the additive effects of the paired sensors also provides much higher sensitivity output than can be attained using a Wheatstone bridge. The use of the sensor element pairs in a subtractive mode provides a comparator function that can be used in a feedback control system. These and other advantages of the circuits of the invention will be apparent from the following description.

As discussed above, the circuits of the invention provide a high sensitivity alternative to the Wheatstone bridge network. Another high sensitivity alternative to the Wheatstone bridge was previously presented in U.S. Pat. No. 5,074,147 ('147 Patent), which is incorporated herein by reference in its entirety. The '147 Patent disclosed a sensor circuit comprising a reference voltage source, an amplifier and a T-network in which the sensor element forms the stem of the T. This circuit is configured so that the voltage across the sensor element remains constant regardless of changes in the resistance or impedance of the sensor element. The use of this circuit provided a significant improvement in sensitivity, flexibility and response while eliminating the problems created by the balancing needs of bridge circuits.

While the T-network circuit of the '147 Patent is a significant improvement over-bridge-based circuits, it retains a degree of susceptibility to inconsistency due to changes in sensor element temperature, which as previously discussed can cause resistance changes in the sensor element. Depending on the sensor type, the data parameter being measured, and the placement of the sensor, other environmental effects can also affect the performance of the sensor circuit. There is accordingly a need for a high sensitivity circuit that is substantially insensitive to temperature effects. The present invention provides high sensitivity sensor circuits that automatically compensate for sensor variations due to environmental effects.

As used herein, the term "environmental effects" refers to all influences on a sensor element that are attributable to parameters other than the target parameter that the sensor is intended to measure. For example, environmental effects on a strain gage intended to measure strain due to a bending moment may include ambient temperature changes and the effects of an axial strain, both of which may produce changes in the sensor element that affect its electrical characteristics (e.g., resistance).

Embodiments of the invention will now be described in more detail. A basic sensor circuit according to an embodiment of the invention comprises a reference voltage, an amplifier and two T-networks, each of which includes a resistance-based sensor element. The sensor circuit is configured to compensate for environmental effects while measuring the change in current flowing through the sensors. The output of the two sensors can be either additive or subtractive depending on the placement of the sensors. Compensation is achieved by using the sensors in a subtractive mode. For example, if one sensor is placed so that it experiences effects due to the target data parameter (e.g., strain) along with environmental effects, but the second sensor is placed so as to experience only the environmental effects (e.g., ambient temperature), the second sensor output is subtracted from the first sensor output so that the output of the circuit is representative of only the target parameter. In another example, a pair of strain gage sensors may be mounted so that the two sensors are subjected to opposite strains (i.e., tension in one and compression in the other). For two sensors intended to monitor temperature only, the output of the circuit is proportional to the difference in the temperatures sensed by the two sensor elements.

Figure 1:
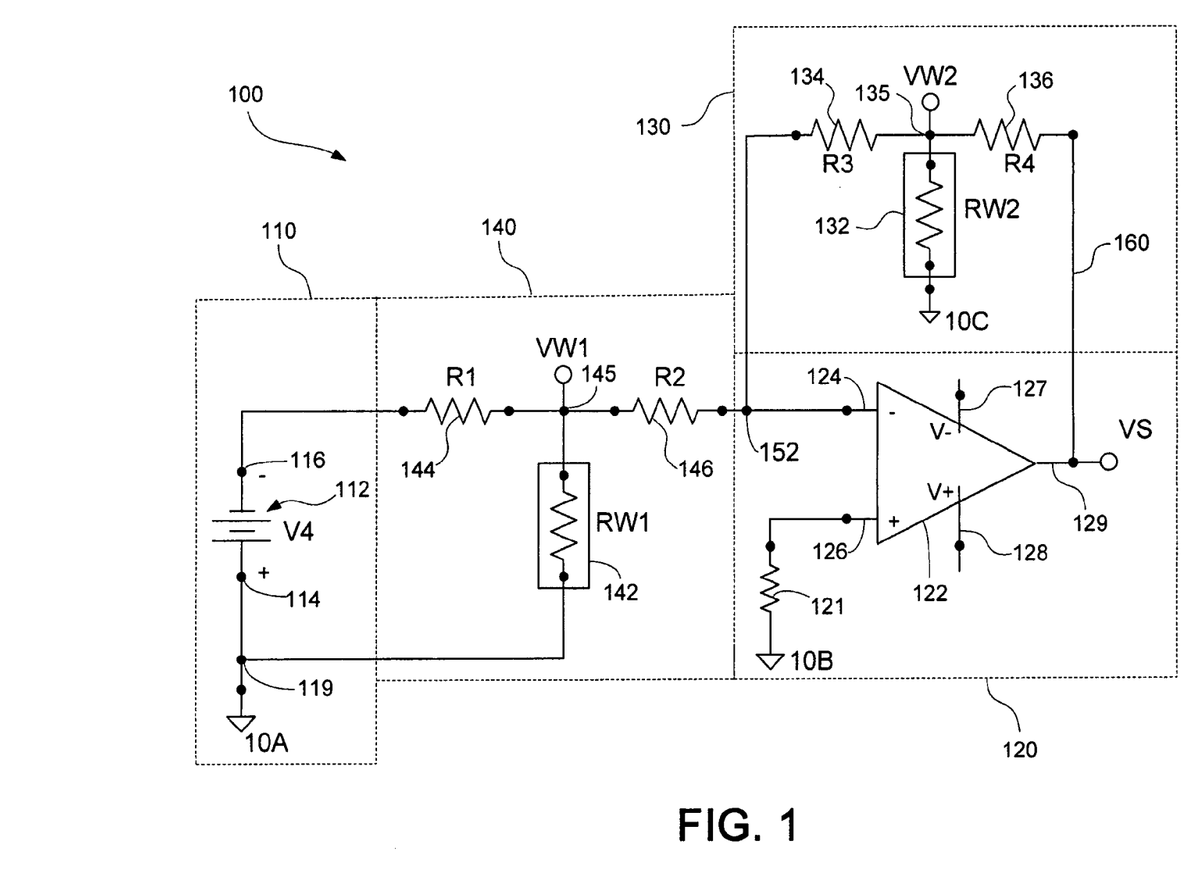
FIG. 1 is a schematic drawing of a sensor circuit according to an embodiment of the invention.

Referring now to the schematic diagram in FIG. 1, a sensor circuit 100 according to an embodiment of the invention comprises the following elements: a reference voltage portion 110, an amplifier portion 120, a first T-network 130 comprising a first sensor element 132 and a second T-network 140 comprising a second sensor element 142.

For purposes of illustration, the specific embodiments described herein are for resistance-based sensor elements and, in particular resistance-based strain gage and temperature sensor elements. It will be understood by those of ordinary skill in the art that the principle and scope of the invention extends to all impedance-based sensor elements including those based on variations in capacitance and inductance.

The first T-network 130 comprises, in addition to the first sensor element 132, first and second impedances 134, 136 having fixed resistance values R3 and R4, respectively. The first sensor element 132 has a variable resistance RW2. As will be discussed in more detail hereafter, the first sensor element 132 may be any conductive element whose resistance changes as a function of external influences such as ambient conditions or changes in a structure to which the conductive element is mounted. The first T-network 130 is formed so that the first and second impedances 134, 136 form the crossbar of the first T and the first sensor element 132 forms the stem of the first T. The first sensor element 132 is connected at a first end to ground 10C and at a second end to the junction 135 between the first T-network impedance 134 and the second T-network impedance 136.

The first T-network 130 is connected to the amplifier portion 120 to form a feedback loop 160. The amplifier portion 120 includes an operational amplifier 122 connected at an inverting terminal 124 to the first T-network 130 and the second T-network 140 as discussed below, and at a non-inverting terminal 126 of the operational amplifier serially to ground 10B. An impedance 121 may be disposed between the non-inverting terminal 126 and ground 10B. This impedance may be selected so as to minimize amplifier drift. The operational amplifier 122 is also connected at terminals 127, 128 to an amplifier power supply (not shown).

The first impedance 134 of the first T-network 130 is serially connected to the junction 152 between the first amplifier terminal 124 and the second T-network 140. The second impedance 136 of the first T-network 130 is serially connected to the output 129 of the operational amplifier 122. The T-network 130 and the operational amplifier 122 thus combine to form the sensor element feedback loop 160.

The reference voltage portion 110 includes a voltage source 112 connected at a first end 114 to ground 10A and to the second sensor 142 at a junction 119. The voltage source 112 is connected at a second end 116 to the second T-network 140 as discussed below. The voltage source 112 supplies a stable reference voltage V4 to the circuit 100.

The second T-network 140 of the sensor circuit 100 comprises a second sensor element 142 having a variable resistance RW1 that forms the stem of the second T and third and fourth impedances 144, 146 having resistance values of R1 and R2, respectively. The third and fourth impedances 144, 146 are connected at a junction 145 and combine to form the crossbar of the second T. The third impedance 144 is serially connected at its other end to the second end 116 of the voltage source 112. The fourth impedance 146 is connected to the first amplifier terminal 124 and the first impedance 134 at junction 152. The second sensor element 142 is connected at one end to the junction 145 between the third and fourth impedances 144, 146 and at its other end to the first end 114 of the voltage source 112 at junction 119.

Changes in voltage at the amplifier output 129 are proportional to net algebraic fractional changes in the resistance RW2 of the first sensor element 132 and the resistance RW1 of the second sensor element 142. In a practical application, either or both of the first and second sensors 132, 142 can be used for target parameter (e.g., strain or temperature) data measurements and for environmental effect compensation roles. For example, when both sensors are used for strain measurements, one sensor may be subjected to tensile strain (increased resistance) and the other sensor simultaneously subjected to compressive strain (reduced resistance) such that their fractional changes algebraically add up to produce larger output voltage changes. When the strains are equal (but opposite) they produce twice the change in the output, as in a Wheatstone bridge, but with much greater sensitivity. Further, the effect of environmental changes is minimized by assuring that the two sensors respond equally to changes in the surrounding temperature environment. This can be accomplished by assuring that the sensors are matched and placed so as to be exposed to the same changes. The specific components of the circuit can be so chosen so as to maximize the cancellation of environmental effects and minimize noise. The considerations for effectiveness of compensation are identical to those encountered in the Wheatstone bridge.

It can be shown that with appropriate choice of component values for the elements in the circuit 100, the sensitivity of the circuit 100 is many times greater than sensor systems based on conventional Wheatstone bridges. This sensitivity comes as an inherent front-end sensitivity of the device without any need for additional amplification. The effect may be illustrated by the following analysis of a temperature compensated strain gage sensor circuit.

For the sensor circuit 100, the following expressions can be shown to be true:

$$VW1 = \left(\frac{RW1}{R1}\right) * V4 \quad \text{(Eq. 1)}$$

where VW1 is the voltage at the junction 145 between the third impedance 144 the fourth impedance 146 and where RW1 is much smaller than R1. In a general design, assuming $$VW2 = VW1 = VW, \quad \text{(Eq. 2a)}$$

$$\text{for } RW2 = RW1 = RW \quad \text{(Eq. 2b)}$$

$$\text{and } R1 = R2 = R3 = R4 = R, \quad \text{(Eq. 2c)}$$

$$\text{then } \left(\frac{\Delta VS}{VW}\right) = \left(\frac{R}{RW}\right)\left[\left(\frac{\Delta RW1}{RW1}\right) - \left(\frac{\Delta RW2}{RW2}\right)\right] \quad \text{(Eq. 3)}$$

where ΔVS is the change in output voltage, VW2 and VW1 are the voltages across the sensors as shown in FIG. 1 and RW is much smaller than R. RW is the sensor resistance under zero strain at an initial set of environmental conditions.

Considering two active strain gages, one being in tension (+ΔRW1/RW1) and the other being in compression (−γRW2/RW2), substituting in Eq. 3 provides:

$$\left(\frac{\Delta VS}{VW}\right) = 2 * \left(\frac{R}{RW}\right) * G * \varepsilon \quad \text{(Eq. 4a)}$$

If only one of the strain gages is used as an active sensor while the other is used only as a compensation sensor, substituting in Eq. 3 provides:

$$\left(\frac{\Delta VS}{VW}\right) = \left(\frac{R}{RW}\right) * G * \varepsilon \quad \text{(Eq. 4b)}$$

Because RW1=RW, VW1=VW and R1=R, (per Eqs. 2a, 2b and 2c), Equation 1 can be rewritten:

$$VW = \left(\frac{RW}{R}\right) * V4 \quad \text{(Eq. 5)}$$

Substituting Eq. 5 into Eq. 4b gives:

$$\Delta VS = 2 \, V4 \, G \, \varepsilon \quad \text{(Eq. 6)}$$

In representative embodiments of the sensor circuit 100, the impedances 144, 146, 134, 136 may be selected so that R/RW is in a range from about 40 to about 45 without significant imposition. Under this condition and within the limitations of the assumed Equations. 2a, 2b and 2c, Equation 6 shows that the output voltage changes ΔVS are directly proportional to the measured strain ε (or other target parameter being measured). It also indicates that the component resistance values will drop out if chosen properly.

As used herein, the term "active sensor" is used to indicate a sensor that is disposed so as to provide data on a target parameter. A "compensation sensor" is one that is disposed so as to experience some or all of the same environmental effects as a corresponding active sensor but is not the effects of the target parameter.

For purposes of comparison, a similar equation may be constructed for a Wheatstone bridge strain gage circuit. It will be understood by those of ordinary skill in the art that under identical conditions, for an equal arm conventional strain gage in a single active gage bridge, the output voltage change equation would be:

$$\left(\frac{\Delta VS}{VW}\right) = \frac{1}{2} G \varepsilon \quad \text{(Eq. 7)}$$

Considering that VW will be one half of the bridge excitation voltage, it can be seen by comparing equations 4b and 7 that a circuit 100 in which the ratio R/RW is set at 40 will be about 160 times more sensitive than a conventional bridge circuit under identical operating conditions.

From Eq. (3), it can be seen that when the first and second sensor elements are identical, and when they are exposed to the same environmental variations, the fractional changes in their resistances due to these variations will be equal, thus canceling these variations in the output ΔVS. This effectively removes the effects of environmental changes such as the effects of changes in ambient temperature on strain gage output.

In some instances, the response of the first and second strain gages to a particular environment may be slightly different. These effects may be removed in one of several ways. One way is to use a computer or other data processor to post-process the raw data signals from the circuit. The post processing algorithm may be based on calibration data and additional environment data obtained from a separate data source. Another way is to use a control loop to match the impedances during calibration. The impedance offset could then be used within the circuit during data measurement.

Figure 2:
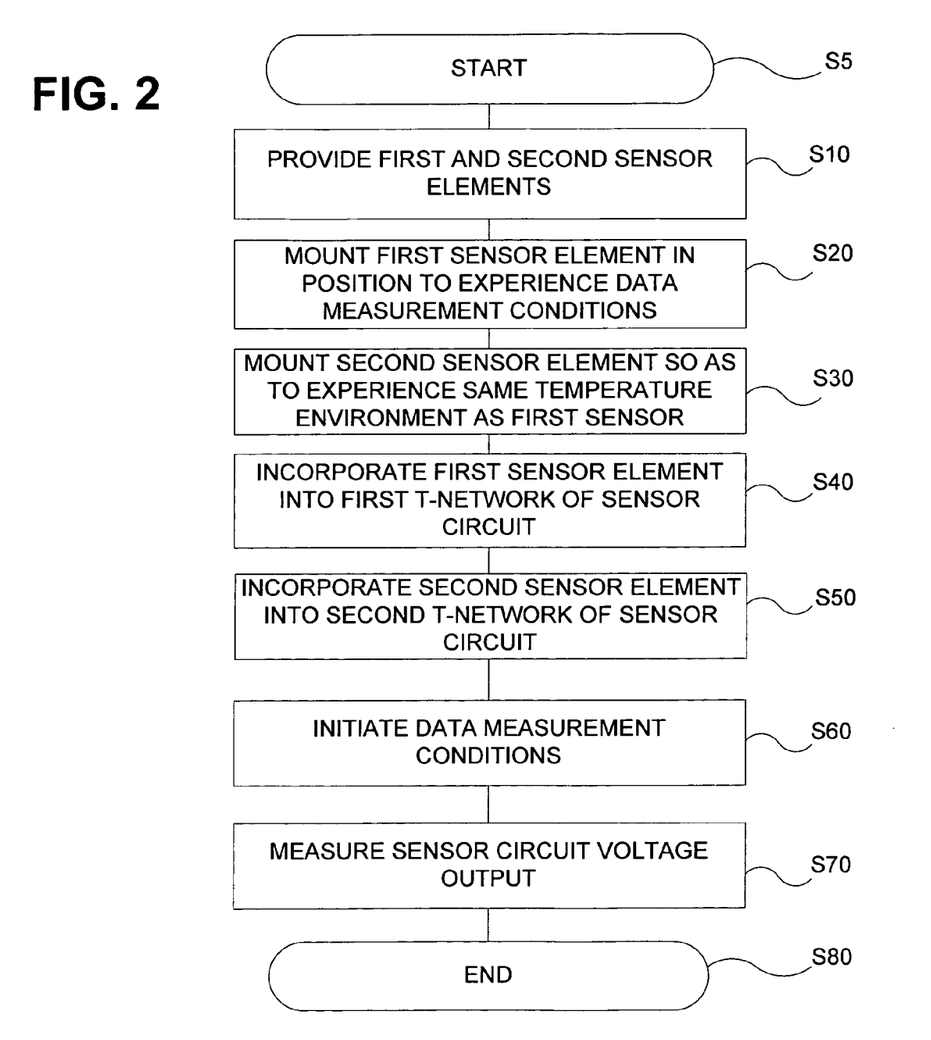
FIG. 2 is a flow diagram of a method of installing and using a sensor circuit according to an embodiment of the invention.

FIG. 2 depicts a flow diagram of a method of installing and using a sensor circuit 100. The method begins at S5 and at S10 first and second sensor elements are provided. The first and second sensor elements may be any data acquisition sensor element used to provide data based on changes in sensor element resistance. The data acquisition sensor elements may be, in particular, strain gage elements or temperature sensor elements. For strain measurements, one sensor element can be placed in a load measurement environment and the second may be a "dummy" gage that is placed so that it experiences the same environmental influences as the first sensor but is isolated from the load measurement environment. The dummy gage, which can thus be used for temperature compensation, may be selected to provide substantially identical behavior to the other sensor element with regard to change in element resistance as a function of temperature. In a particular environment, the response of the two sensors to changes in temperature will be identical while only one of them actually is being subjected to strain.

At S20, the first sensor element is mounted in a data measurement configuration. As used herein, the term "data measurement configuration" means a disposition and location of a sensor element relative to a structure that will allow the sensor element to provide data regarding a data measurement parameter of interest that occurs under a data measurement condition. As used herein, the term "data measurement condition" means an environment or condition imposed on a structure, a response of a structure to an imposed environment or condition, or an interaction of a structure with an imposed environment or condition. When a data acquisition sensor element in a sensor circuit of the invention is placed in a data measurement configuration, the sensor circuit provides an output voltage proportional to the changes in resistance of the data acquisition sensor element, which in turn is proportional to the data measurement parameter.

In the case of strain gages, the data measurement configuration involves the mounting of the strain gage element on a structure so as to measure a particular strain in the structure (the data measurement parameter) when a load is applied to the structure (the data measurement condition). It will be understood that at the same time the active (i.e., data acquisition) sensor element is subjected to the data measurement condition, it is also subject to environmental conditions, including the ambient temperature. Changes in the ambient temperature will produce changes in resistance in the data acquisition sensor element. As previously discussed, a compensation sensor element can be used to remove temperature and other environmental effects. Accordingly, at S30, the second sensor element is mounted in an environment compensation configuration. As used herein, the term "environment compensation configuration" means any disposition and location of a sensor element that will allow that sensor element to experience the same environmental effects as an associated data acquisition sensor element.

It will be understood that the environment compensation configuration may depend on the nature of the sensor element and the compensatable environmental effects anticipated. In a typical embodiment, the environment compensation sensor element will be a virtual copy of the data acquisition sensor element. In a case where the two sensors are strain gages, the environment compensation configuration may include any installation and placement that results in no change in sensor element structure or geometry when the data measurement condition is applied. In the case of thin film sensors, the environment compensation configuration may include any installation and placement that isolates the compensation sensor element from such influences as the convective heating environment. In both cases, however, the compensation sensor element should be placed sufficiently near the data acquisition sensor element that there is an assurance that both sensor elements are experiencing the same ambient conditions.

As noted above, the second sensor may be mounted so as to be isolated from the data measurement condition. In this configuration, resistance changes in the second sensor element are due only to changes in environmental conditions. Alternatively, the second sensor element may be placed in a second data measurement configuration as well as an environment compensation configuration. For example, if the first sensor is a strain gage mounted so as to measure tensile strain, the second sensor may be an identical strain gage mounted so that it measures compressive strain. This configuration provides high sensitivity and environment compensation.

Under some circumstances, compensation for certain environmental effects (e.g., residual strain) may not be complete, In such cases, additional compensation may be accomplished using software-based compensation based on mathematical models.

It will be understood that whether the data acquisition and environment compensation sensor elements are mounted to the same structure may depend on the type of sensor element, the data measurement condition, the relative difficulty of isolating the temperature compensation sensor element, and the overall data acquisition application (e.g., whether data is acquired in a laboratory versus a "real world" environment).

At S40 and S50, the first and second sensor elements are incorporated into the first and second T-networks, respectively. It will be understood by one of ordinary skill in the art that this may be accomplished before, after or during the mounting of the sensor elements. At S60, the structure and the first sensor element are exposed to the data measurement condition. At S70, the output voltage from the active sensor circuit is monitored and/or recorded. As previously discussed, the output voltage changes will be based on the resistance changes of the two sensor elements with changes due to environmental effects removed by the previously discussed compensation approach. The method ends at S80.

In addition to their high sensitivity and compensation capabilities, the paired sensor circuit 100 can also be used as a nulling device. This is accomplished by placing one of the sensors 132, 142 (active sensor) in a data measurement configuration for measuring response to a data measurement condition and placing the other sensor in an environment compensation configuration where it is shielded from the data measurement condition. The circuit 100 is then driven to its null value by imposing an opposite "force" on the active sensor. Measuring the current required to drive the circuit 100 to its null value provides a measure of the data measurement condition. An example where this approach is useful is in magnetic field or current measurements. In such a case, the active sensor is subject to a magnetic field that is to be measured. A magnetic field (generated, for example, by a current carrying coil) in the opposite direction of the field to be measured is applied to the active sensor. When the magnetic field in the coil is equal in magnitude to the field to be measured, the current through the coil provides a direct measure of the unknown magnetic field amplitude. This method is advantageous in that the sensor is operated at its null point, where inaccuracies resulting from tolerances, temperature drift and non-linearities in the sensor characteristics are negligible.

Figure 3:
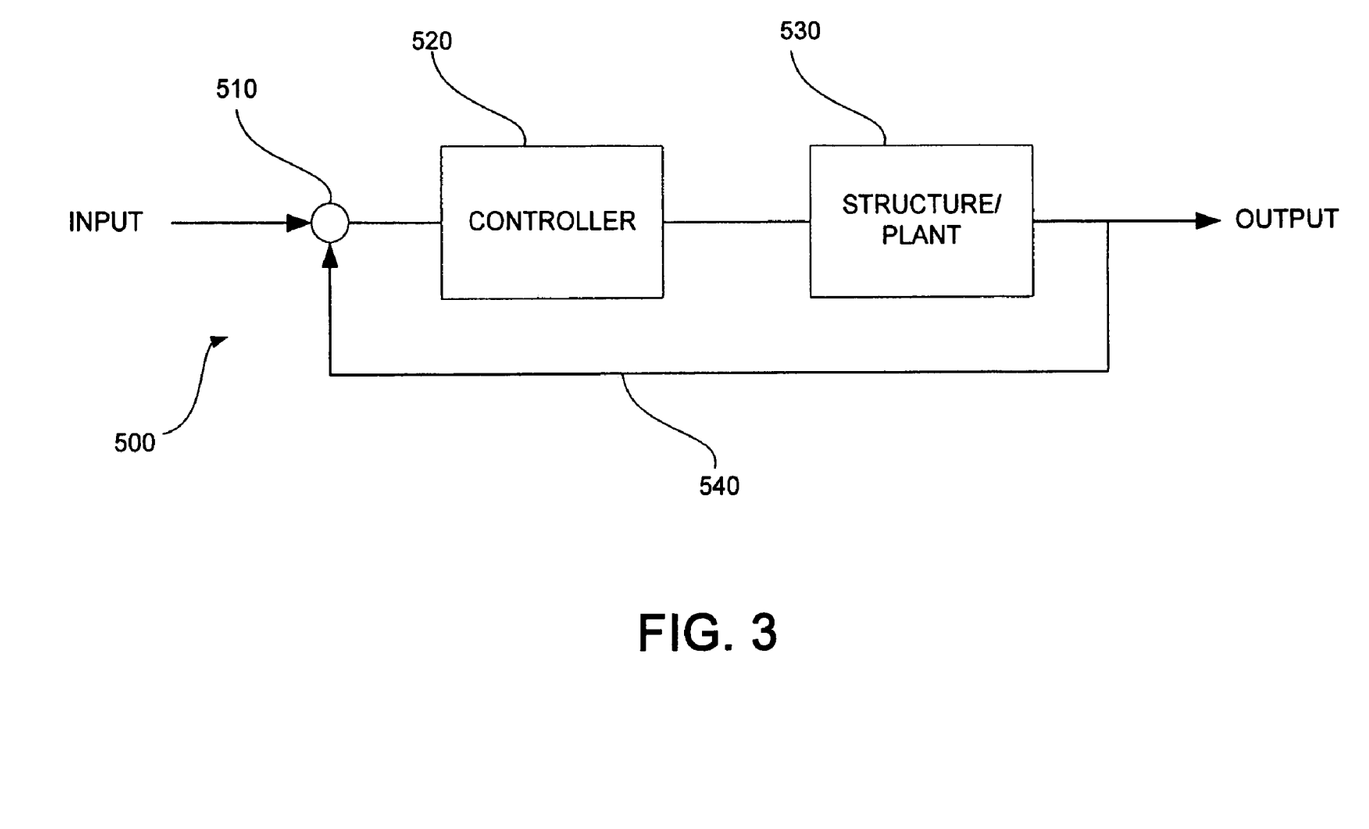
FIG. 3 is a schematic representation of a control system for use with sensor circuits of the invention.

Another use of the circuits of the invention is in feedback control systems based on real-time detection and control of an error function (i.e., a variable that equals the difference between a desired performance and an actual performance). With reference to FIG. 3, a control system 500 may include a sensor circuit 510 incorporating paired sensor networks as described above. The sensor circuit 510 acts as a differencing junction between a target response (INPUT) and an actual response feedback 540 (OUTPUT) from a physical plant or structure 530, the behavior of which is being measured by the sensor circuit 510. The sensor circuit 510 may be configured as is the circuit 100 in FIG. 1 with first and second sensors. The two sensors may be configured and placed as previously described to allow determination of the target response of the physical plant or structure 530 to a data measurement condition. The control system 500 further includes a controller 520, which receives the output of the circuit 510 and provides command signals to the physical plant 530. The physical plant 530 may include actuators or other mechanisms for altering the characteristics (e.g., structural form or activity) of the physical plant 530 so as to change its response to the measurement condition and zero the output of the sensor circuit 510.

In some embodiments, the control system 500 may be adapted for use in a self-nulling mode. In this mode, the desired sensor circuit output is zero. Thus, when a data measurement condition is established, the control system 500 acts to reduce the output response of the plant 530 as measured by the sensor circuit 510 to zero.

The circuit could also be used to calibrate a production sensor by placing it in a circuit pair with a standard sensor under identical operating conditions. In some embodiments, the circuit can be used enable a self-calibrating sensor when a known standard is incorporated into the measurement device.

Figure 4:
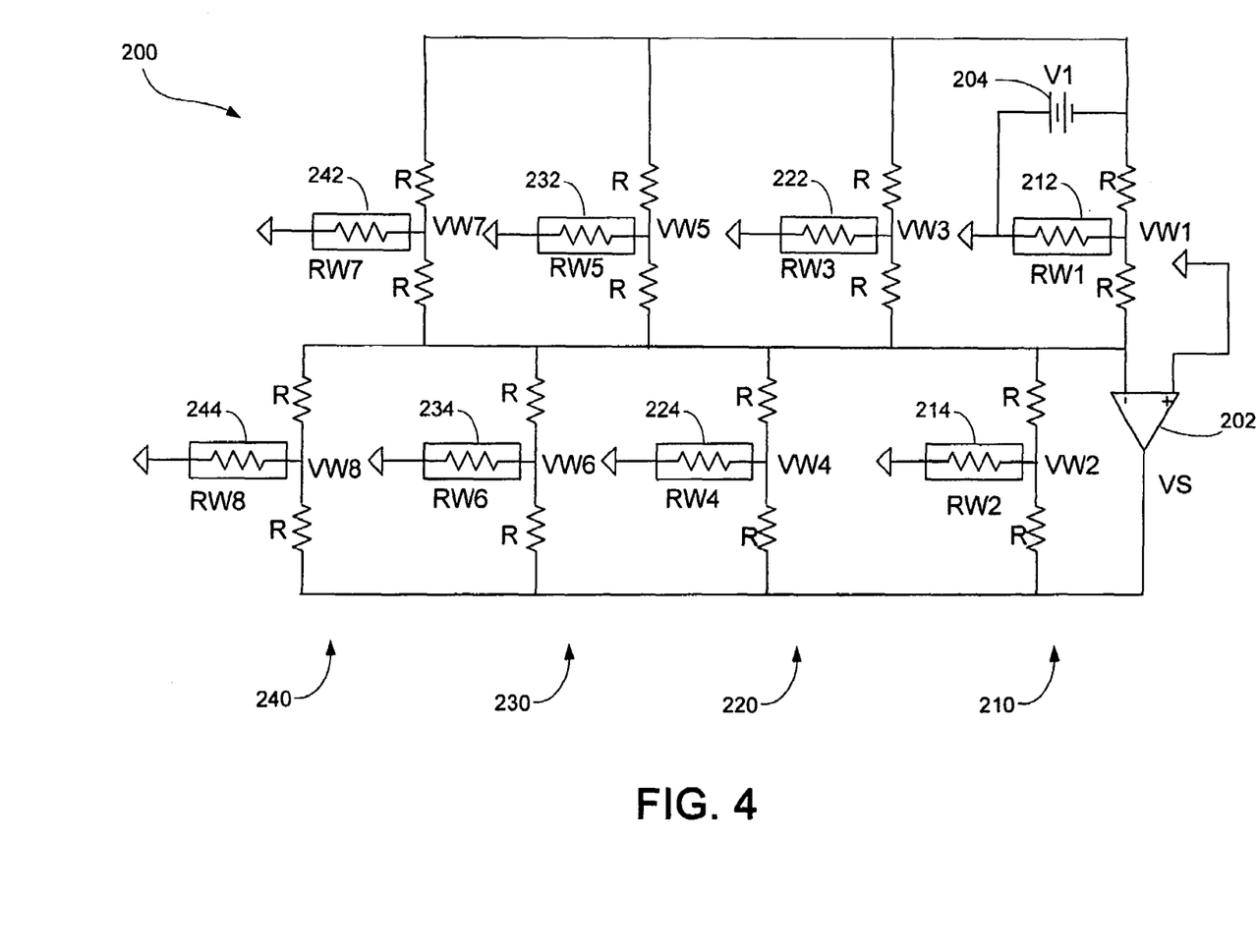
FIG. 4 is a schematic drawing of a sensor circuit according to an embodiment of the invention.
Figure 5:
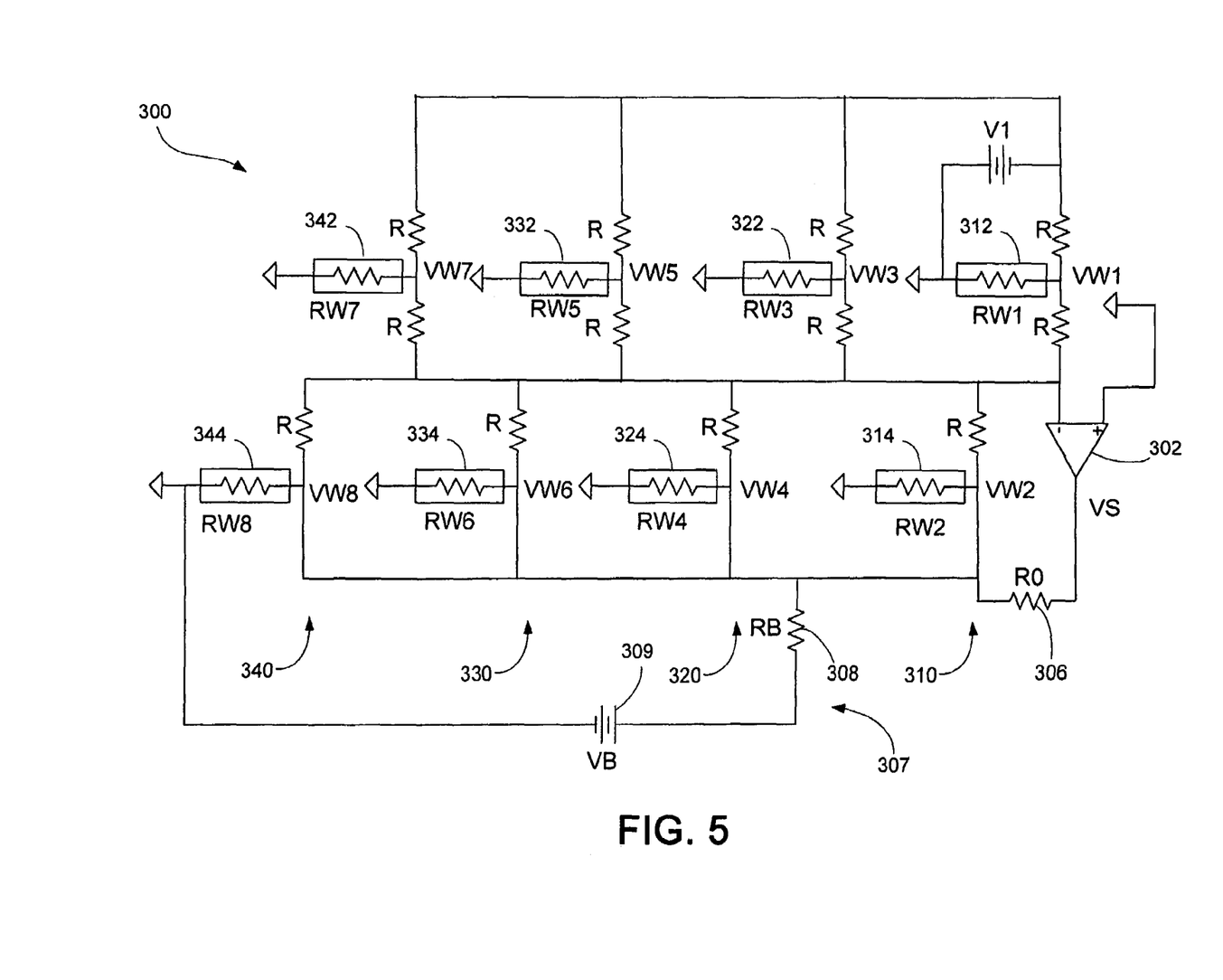
FIG. 5 is a schematic drawing of a sensor circuit according to an embodiment of the invention.

The principles of the two T-network sensor circuit 100 can be extended to circuits having any number of T-network pairs, each pair having an active (data acquisition) sensor and a dummy (compensation) sensor. FIGS. 4 and 5 illustrate circuit embodiments that incorporates four sensor pairs. With reference to FIG. 4, a circuit 200 includes four sensor pairs 210, 220, 230, 240, an amplifier 202, a voltage source 204 supplying voltage V1. The sensors in each sensor pair 210, 220, 230, 240 are incorporated into T-networks similar to those discussed above. The first sensor pair 210 includes a first sensor 212 having resistance RW1 and a second sensor 214 having a resistance RW2. The second sensor pair 220 includes a first sensor 222 having resistance RW3 and a second sensor 224 having a resistance RW4. The third sensor pair 230 includes a first sensor 232 having resistance RW5 and a second sensor 234 having a resistance RW6. The fourth sensor pair 240 includes a first sensor 242 having resistance RW7 and a second sensor 244 having a resistance RW8. All of the impedances in the eight T-networks have the same resistance value R. In each pair of sensors, the second sensor can be used as a compensation sensor for the first sensor in a subtractive mode or the two sensors can be used in an additive mode.

FIG. 5 illustrates a circuit 300 that is similar to the circuit 200 of FIG. 4 except that the second sensor T-networks use a single common resistor as one branch of the T. The circuit 300 includes four sensor pairs 310, 320, 330, 340, an amplifier 302, a voltage source 304 supplying voltage V1. The sensors in each sensor pair 310, 320, 330, 340 are incorporated into T-networks similar to those discussed above. The first sensor pair 310 includes a first sensor 312 having resistance RW1 and a second sensor 314 having a resistance RW2. The second sensor pair 320 includes a first sensor 322 having resistance RW3 and a second sensor 324 having a resistance RW4. The third sensor pair 330 includes a first sensor 332 having resistance RW5 and a second sensor 334 having a resistance RW6. The fourth sensor pair 340 includes a first sensor 342 having resistance RW7 and a second sensor 344 having a resistance RW8. All of the impedances in the eight T-networks have the same resistance value R. All the currents from individual pairs are summed into the impedance 306 having resistance R0. To prevent the output VS going into saturation limits, an offset arrangement 307 comprising an impedance 308 having resistance RB and a voltage source 309 supplying voltage VB may be added. More sensor pairs can be added of the voltage levels can be managed to be within the linear limits of the operational amplifier 302.

An equation for the output of the circuit 300 can be developed in the same manner as for the single pair circuit described above:

Assuming that R0=R and
$$RW1=RW2=RW3=RW4=RW5=RW6=RW7=RW8$$

and
$$VW1=VW2=VW3=VW4=VW5=VW6=VW7=VW8=VW$$

then

Eq. 8

$$\left(\frac{\Delta VS}{VW}\right) = \left(\frac{R}{RW}\right) * \begin{bmatrix} \left[\left(\frac{\Delta RW1}{RW1}\right) - \left(\frac{\Delta RW2}{RW2}\right) + \left(\frac{\Delta RW3}{RW3}\right) - \left(\frac{\Delta RW4}{RW4}\right) + \ldots \right] \\ \ldots \\ \left[\left(\frac{\Delta RW5}{RW5}\right) - \left(\frac{\Delta RW6}{RW6}\right) + \left(\frac{\Delta RW7}{RW7}\right) - \left(\frac{\Delta RW8}{RW8}\right) \right] \end{bmatrix}$$

Equation 8 shows that the changes in odd number sensors are reflected with a positive sign and even number sensors have negative signs, all of them adding algebraically for the output. With each pair of sensors added, the output voltage VS increases along with the additional sensitivity. Because of limitations imposed on the output voltage levels, adding additional sensors may necessitate the addition of an output offset adjustment 307 in order to keep the operational amplifier 302 from saturating while still yielding high sensitivity.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

It will be understood that the present invention may be practiced by adding additional steps to the methods, omitting steps, and/or altering the order in which the steps are performed in the process. Many modifications to the embodiments described above can be made without departing from the spirit and scope of the invention. Accordingly, the foregoing disclosure is not intended to be construed or to limit the present invention or otherwise to exclude any other such embodiments, adaptations, variations, modifications and equivalent arrangements.

What is claimed is:

1. A sensor circuit comprising:
   a first T-network including a first impedance serially connected to a second impedance at a first junction and a first variable resistance sensor element connected at a first end to the first junction and at a second end to ground;
   an operational amplifier having a non-inverting amplifier input terminal connected to ground, an inverting amplifier input terminal connected to the first impedance at a second junction and an amplifier output terminal connected to the second impedance;
   a second T-network including a third impedance serially connected to a fourth impedance at a third junction and a second variable resistance sensor element having first and second sensor element ends, the first sensor element end being connected to the third junction and the fourth impedance being connected to the second junction; and
   a constant voltage source connected to the third impedance and to ground, the second end of the second variable resistance sensor element being connected to a fourth junction intermediate the constant voltage source and ground.

2. A sensor circuit according to claim 1 wherein the first and second variable resistance sensor elements exhibit substantially the same variation in resistance as a function of temperature.

3. A sensor circuit according to claim 1 wherein the first variable resistance sensor element is mountable to a structure under a set of environmental conditions in a manner such that the resistance of the first variable sensor element changes as a function of data measurement conditions applied to the structure.

4. A sensor circuit according to claim 3 wherein the second variable resistance sensor element is mountable in a location under the set of environmental conditions but isolated from the data measurement conditions.

5. A sensor circuit according to claim 3 wherein the second variable resistance sensor element is mountable to the structure under the set of environmental conditions in a manner such that the resistance of the second variable sensor element changes as a function of the data measurement conditions applied to the structure.

6. A sensor circuit according to claim 1 wherein the first variable resistance sensor element comprises a first strain gage element that is mountable to a structure under a set of environmental conditions and is adapted to change resistance in proportion to a strain in the structure.

7. A sensor circuit according to claim 6 wherein the second variable resistance sensor element comprises a second strain gage element.

8. A sensor circuit according to claim 7 wherein the first and second strain gage elements have substantially identical resistance characteristics.

9. A sensor circuit according to claim 7 wherein the second strain gage element is mountable in a location under the set of environmental conditions but isolated from the strain in the structure.

10. A sensor circuit according to claim 7 wherein the second strain gage element is mountable to the structure under a set of environmental conditions and is adapted to change resistance in proportion to the strain in the structure.

11. A feedback control system comprising a feedback loop comprising the sensor circuit of claim 1, the feedback control system being adapted for zeroing an error function corresponding to an output voltage of the sensor circuit.

12. A strain gage sensor circuit comprising:
    a first T-network including a first impedance serially connected to a second impedance at a first junction and a first strain gage sensor element connected at a first end to the first junction and at a second end to ground;
    an operational amplifier having a non-inverting amplifier input terminal connected to ground, an inverting amplifier input terminal connected to the first impedance at a second junction and an amplifier output terminal connected to the second impedance;
    a second T-network including a third impedance serially connected to a fourth impedance at a third junction and a second strain gage sensor element having first and second strain gage element ends, the first strain gage element end being connected to the third junction and the fourth impedance being connected to the second junction; and
    a constant voltage source connected to the third impedance and to ground, the second end of the second strain gage element being connected to a fourth junction intermediate the constant voltage source and ground.

13. A strain gage sensor circuit according to claim 12 wherein the first strain gage element is mountable to a structure in a temperature environment and is adapted to change resistance in proportion to a strain in the structure.

14. A strain gage sensor circuit according to claim 13 wherein the second strain gage element is mountable in a location in the temperature environment but isolated from the strain in the structure.

15. A strain gage sensor circuit according to claim 13 wherein the second strain gage element is mountable to the structure in the temperature environment and is adapted to change resistance in proportion to the strain in the structure.

16. A sensor circuit according to claim 12 wherein the first and second strain gage elements have substantially identical resistance characteristics.

17. A method of obtaining sensor data using a sensor circuit having a first T-network adapted for incorporating a first variable resistance sensor element, an operational amplifier combining with the first T-network to form a sensor feedback loop, a second T-network connected to the first T-network and the operational amplifier, the second T-network being adapted for incorporating a second variable resistance sensor element, and a constant voltage source connected to the second T-network, the sensor circuit being adapted to provide an output voltage proportional to changes in the resistance of the first sensor element when the first sensor element is subjected to a data measurement condition of interest, the method comprising:
    mounting the first variable resistance sensor element to a structure in a data measurement configuration in which the first variable resistance sensor element will experience the data measurement condition of interest and a set of environmental conditions;

incorporating the first variable resistance sensor element into the first T-network;

mounting the second variable resistance sensor element in an environment compensation configuration in which the second variable resistance sensor will experience the set of environmental conditions;

incorporating the second variable resistance sensor element into the second T-network;

establishing the data measurement condition and the set of environmental conditions; and monitoring the output voltage of the sensor circuit.

18. A method of obtaining sensor data according to claim 17 wherein the first and second variable resistance sensor elements exhibit substantially the same variation in resistance as a function of environmental conditions.

19. A method of obtaining sensor data according to claim 17 wherein the first variable resistance sensor element comprises a first strain gage element and wherein the action of mounting the first variable resistance sensor element to a structure includes:

applying the first strain gage element to a surface of the structure.

20. A method of obtaining sensor data according to claim 19 wherein the action of establishing the data measurement condition and the set of environmental conditions includes:

applying a load to the structure.

21. A method of obtaining sensor data according to claim 20 wherein the second variable resistance sensor element comprises a second strain gage element.

22. A method of obtaining sensor data according to claim 21 further comprising:

applying the second strain gage element to the surface of the structure.

23. A method of obtaining sensor data according to claim 22 wherein the first and second strain gage elements are positioned so that the first strain gage element measures a tensile strain and the second strain gage element measures a compressive strain.

* * * * *